(No Model.) 2 Sheets—Sheet 1.

E. BUCHAN.
MEASURING DEVICE FOR BOTTLES.

No. 465,750. Patented Dec. 22, 1891.

Witnesses
J. Edw. Maybee
W. G. McMillan

Inventor
Ewing Buchan
by Donald C. Ridout & Co.
Attys.

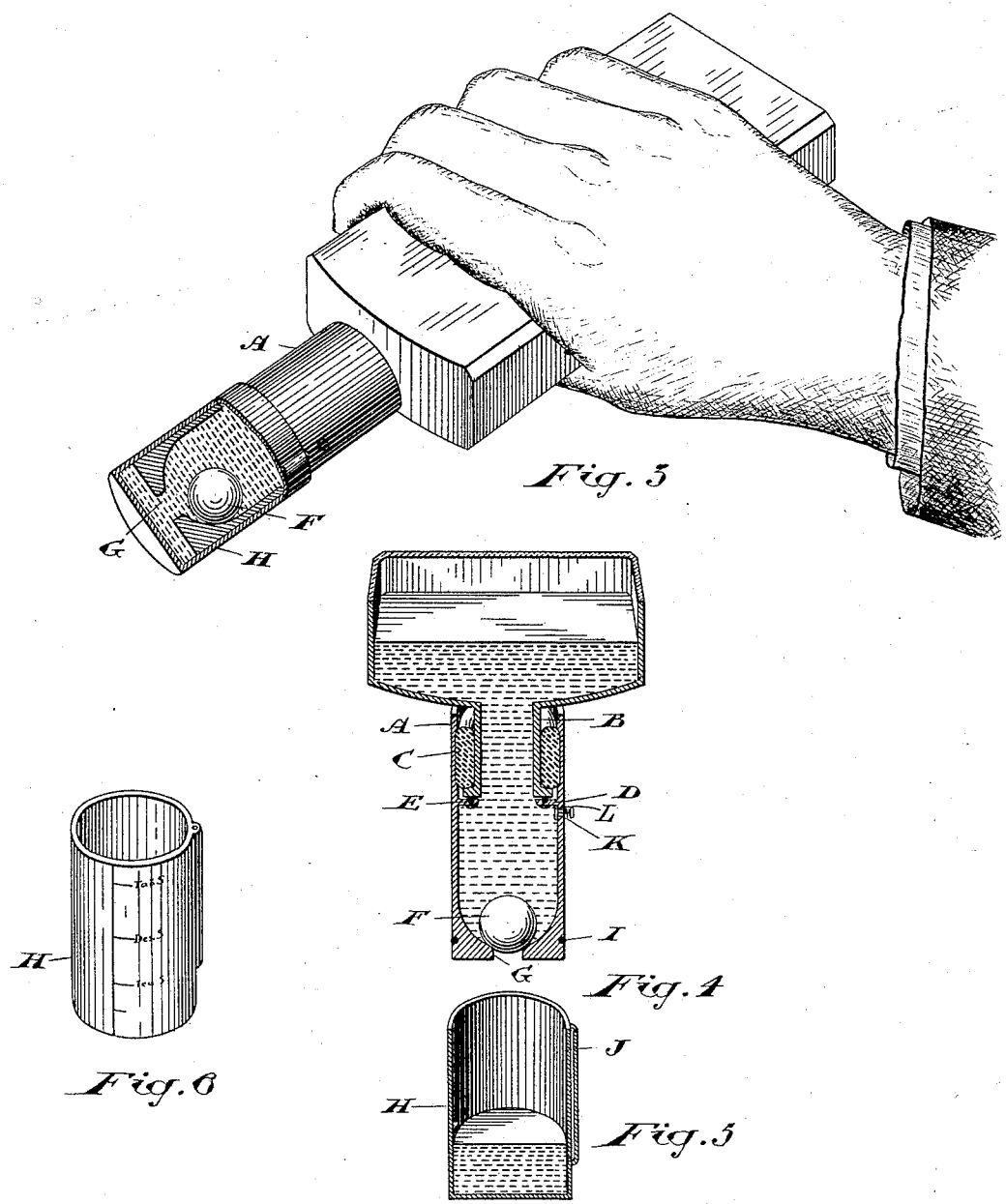

UNITED STATES PATENT OFFICE.

EWING BUCHAN, OF TORONTO, CANADA.

MEASURING DEVICE FOR BOTTLES.

SPECIFICATION forming part of Letters Patent No. 465,750, dated December 22, 1891.

Application filed April 27, 1891. Serial No. 390,630. (No model.)

*To all whom it may concern:*

Be it known that I, EWING BUCHAN, banker, of the city of Toronto, in the county of York, in the Province of Ontario, Canada, have invented a certain new and Improved Measuring Device for Bottles, of which the following is a specification.

The object of the invention is to provide a simple attachment to a bottle by which the contents of the bottle may be measured out in any given quantities; and it consists, essentially, of a cylinder fitted onto the neck of a bottle and containing a ball designed to act as a stopper to the bottle, and to a hole made in the end of the cylinder, and a vessel adjustably fitted onto the cylinder, the parts mentioned being formed and arranged in connection with each other, substantially as and for the purpose hereinafter more particularly explained.

Figure 1:
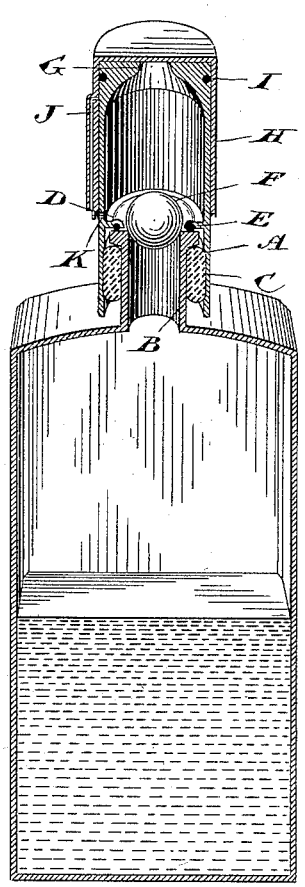
Figure 2:
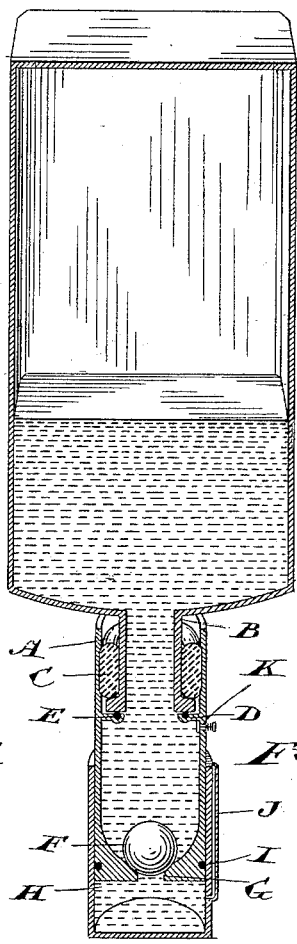

Figure 1 is a perspective sectional side elevation of a bottle in its normal position provided with my improved measuring device. Fig. 2 is a similar view, the bottle being shown upside down. Fig. 3 is a view of the same bottle, showing the measuring device in section and the ball in the position it will appear while the liquid is being poured into the measuring-vessel. Fig. 4 is a view of a measuring device similar to Fig. 2, except that the measuring-vessel is withdrawn and shown by itself in Fig. 5. Fig. 6 is a perspective outside view of the measuring-vessel.

In the drawings like letters of reference indicate corresponding parts in each figure.

A represents a cylinder made to fit over the neck B of the bottle. In order to make a perfect hermetically-sealed joint between the interior of the cylinder A and the neck of the bottle B, I insert a ring C, made of rubber or other similar elastically-compressible material. In order to still further insure the sealing of the said joint, I sometimes form in the interior of the cylinder A a flange D, formed to hold an elastically-compressible ring E.

F is a ball made the proper size to form a stopper for the mouth of the bottle, and also as a stopper for the hole G, made in the end of the cylinder A.

H is a measuring-vessel fitted onto the cylinder A. An elastically compressible-ring I, fitted into a groove formed in the end of the cylinder A, forms a joint between the measuring-vessel H and the cylinder A. While the vessel H can be adjusted freely on the cylinder, any liquid which may enter the vessel H will not escape past the ring I. When the bottle is placed in the position indicated in Fig. 1, the ball F acts as a stopper to the bottle, while the vessel H, pressed down on the cylinder A, as indicated in the figure referred to, acts as a cap to still further seal the mouth of the bottle. The measuring-vessel H is marked, as indicated in Fig. 6, to indicate the various quantities of liquid it may be desired to measure—that is to say, one-half tea-spoonful, tea-spoonful, dessert-spoonful, and so on.

In using the measure I first adjust the vessel H to hold the quantity required. For instance, as shown in Fig. 3, it is adjusted to hold a tea-spoonful. The bottle is then turned, as shown in Fig. 3, when the ball F will naturally roll from the mouth of the bottle and the liquid in passing into the cylinder A escapes through the hole G into the vessel H. When the space left between the bottom of the vessel H and the end of the cylinder A is full, the bottle is turned completely upside down, as shown in Figs. 2 and 4, when the ball F rests in and hermetically seals the hole G. The vessel H can then be removed and will contain the desired quantity. As the liquid would not flow without air-vents, I make an air-vent J in the vessel H and an air-vent K in the cylinder A. I do not confine myself to the particular location of the air-vents mentioned, as of course they may be placed in various places and yet accomplish their purpose.

Although my invention is especially designed for use in administering medicine, it of course may be used for measuring liquids of any kind.

It will be observed that as the vessel H can be removed from the cylinder A and the cylinder A from the neck B of the bottle and all the other parts readily separated the whole device can easily be kept perfectly clean and sweet.

In order to prevent the liquid escaping from the cylinder A through the air-vent K, I apply a valve L over the said vent, holding the said valve in position by the action of a spring.

What I claim as my invention is—

1. As an improved measuring device, a cylinder fitted onto the neck of a bottle and having a hole in its end opposite the said neck, a ball contained in the said cylinder and designed to close either the mouth of the bottle or the hole in the end of the cylinder, in combination with an adjustable measuring-vessel fitted over the cylinder and marked to indicate the various quantities it may contain, substantially as and for the purpose specified.

2. A cylinder A, fitted onto the neck B of a bottle and hermetically sealed thereon by the elastically-compressible ring C, a ball F contained in and a hole G made through the end of the said cylinder, in combination with the measuring-vessel H, fitted onto the cylinder A over the elastically-compressible ring I, and air-vent J formed in the vessel H and air-vent K in the cylinder A, substantially as and for the purpose specified.

3. A cylinder A, fitted onto the neck B of a bottle and hermetically sealed thereon by the elastically-compressible ring C, a flange D, formed in the cylinder A and holding the elastically-compressible ring E, which rests on the top of the neck of the bottle B, a ball F contained in and a hole G made through the end of the cylinder, in combination with the measuring-vessel H, fitted onto the cylinder A over the elastically-compressible ring I, and air-vent J formed in the vessel H and air-vent K in the cylinder A, substantially as and for the purpose specified.

4. A cylinder A, fitted onto the neck B of a bottle and hermetically sealed thereon by the elastically-compressible ring C, a ball F contained in and a hole G made through the end of the said cylinder, in combination with the measuring-vessel H, fitted onto the cylinder A over the elastically-compressible ring I, air-vent J formed in the vessel H and air-vent K in the cylinder A, and spring-valve L to protect the air-vent K, substantially as and for the purpose specified.

Toronto, April 23, 1891.

EWING BUCHAN.

In presence of—
C. J. HOLMAN,
CHARLES C. BALDWIN.